United States Patent [19]

Orbach

[11] Patent Number: 4,949,257
[45] Date of Patent: Aug. 14, 1990

[54] AUTOMATED MERCHANDISING SYSTEM FOR COMPUTER SOFTWARE

[76] Inventor: Zvi Orbach, 143A Derech HaYam, Haifa, Israel

[21] Appl. No.: 433,395

[22] Filed: Nov. 7, 1989

Related U.S. Application Data

[63] Continuation of Ser. No. 184,923, Apr. 22, 1988, abandoned.

[30] Foreign Application Priority Data

Apr. 28, 1987 [IL] Israel .................................. 82370

[51] Int. Cl.⁵ .............................................. G06F 3/08
[52] U.S. Cl. ..................................... 364/401; 364/479
[58] Field of Search .............................. 364/401, 479

[56] References Cited

U.S. PATENT DOCUMENTS

| | | | |
|---|---|---|---|
| 4,593,376 | 6/1986 | Volk | 364/900 |
| 4,597,058 | 6/1986 | Izumi | 364/900 |
| 4,654,799 | 3/1987 | Ogaki et al. | 364/479 |
| 4,672,554 | 6/1987 | Ogaki | 364/479 |

FOREIGN PATENT DOCUMENTS 0122040 10/1984 European Pat. Off. .
2170943 8/1986 United Kingdom .

*Primary Examiner*—Charles E. Atkinson
*Assistant Examiner*—Gail O. Hayes
*Attorney, Agent, or Firm*—Cushman, Darby & Cushman

[57] ABSTRACT

An automated merchandising system for computer software including a central memory for storing software for sale to customers, interface apparatus for receiving a software select customer choice input having associated therewith payment identification apparatus, and apparatus for writing software selected by a customer onto a software carrier and dispensing same to the customer.

18 Claims, 2 Drawing Sheets

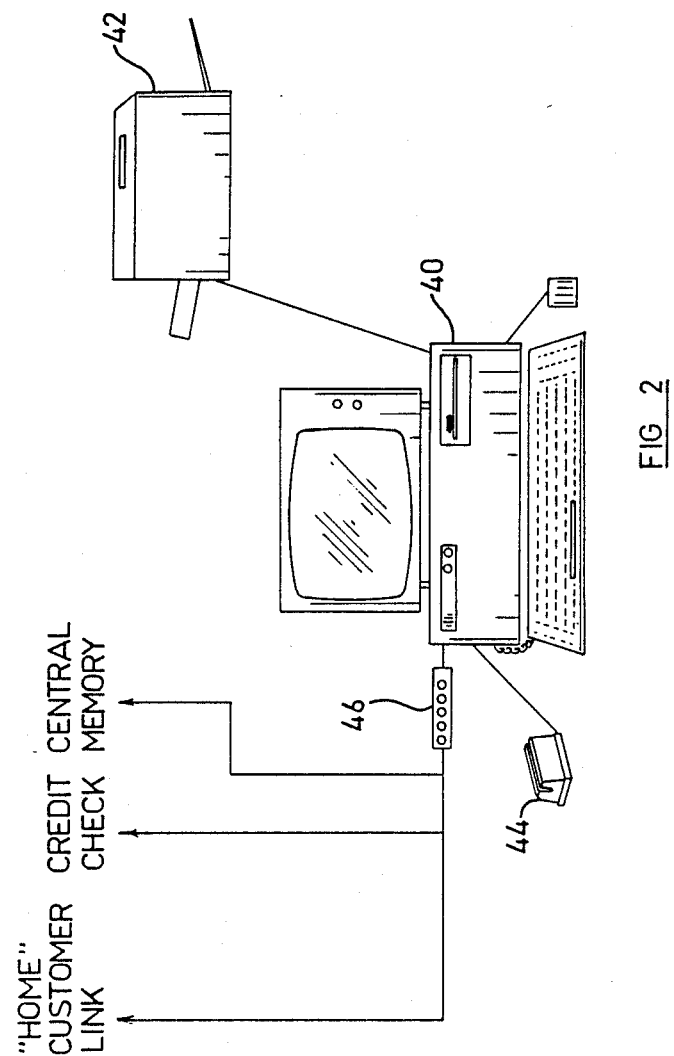

AUTOMATED MERCHANDISING SYSTEM FOR COMPUTER SOFTWARE

This is a continuation of application Ser. No. 07/184,923, filed Apr. 22, 1988, which was abandoned upon the filing hereof.

FIELD OF THE INVENTION

The present invention relates to merchandising systems generally and more particularly to merchandising systems for computer software.

BACKGROUND OF THE INVENTION

In recent years, personal computer software has become a major consumer industry and sales of pre-packaged software have grown enormously. Generally sales of personal computer software have been carried out in two ways. About half of the sales are by mail order, which does not afford the consumer the possibility of experiencing use of the software prior to purchase, and denies the consumer instant gratification because he must wait for delivery of the software by mail or courier.

The remainder of personal computer software sales are retail. Retail sales of personal computer software are considered to be costly due to high stocking requirements and the requirement of relatively skilled salespeople, thus increasing the cost of sales and the ultimate cost to the customer.

At the same time, software carriers have become more standardized, so as to enable most types of software to be embodied one of a relatively small number of conventional diskette formats.

SUMMARY OF THE INVENTION

The present invention seeks to provide an automated merchandising system for computer software.

There is thus provided in accordance with a preferred embodiment of the present invention an automated mechandising system for computer software including a central memory for storing software for sale to customers, interface apparatus for receiving a software select customer choice input having associated therewith payment identification apparatus, and apparatus for writing software selected by a customer onto a software carrier and dispensing same to the customer.

Additionally in accordance with a preferred embodiment of the invention, apparatus is also provided for printing manuals accompanying the software selected by the customer and dispensing same to the customer.

Further in accordance with an embodiment of the invention, apparatus is provided for preventing copying of software dispensed to the customer.

In accordance with one embodiment of the invention, the central memory is located at a point of sale terminal. According to an alternative embodiment of the invention, the central memory is located at a location remote from the point of sale terminal and may be connected with one or more point of sale terminals by means of a modem or any other suitable apparatus.

In accordance with a preferred embodiment of the invention, a plurality of point of sale terminals are provided in communication with a central memory.

In accordance with a preferred embodiment of the invention, the central memory also contains information used to print manuals.

Additionally in accordance with a preferred embodiment of the invention, the point of sale terminal may be remotely accessed by a customer via a modem.

Further in accordance with an embodiment of the invention, apparatus is provided to generate an identification code which is associated with the purchased software. The identification code comprises one or more of the following identification parameters: purchaser identification, point of sale identification, program identification, serial number for program copy, date of purchase.

Additionally in accordance with an embodiment of the invention apparatus is also provided for generating a sales report in hard copy form including at least one of the following identification parameters: purchaser identification, point of sale identification, program identification, serial number for program copy, date of purchase.

Further in accordance with an embodiment of the invention apparatus is also provided for generating and displaying a menu for enabling a potential customer to search and locate software in which he has a potential interest.

Additionally in accordance with an embodiment of the invention, there is also provided demonstration computer apparatus for providing to a potential customer the opportunity for operating the software prior to a decision to purchase.

BRIEF DESCRIPTION OF THE INVENTION

The present invention will be understood and appreciated more fully from the following detailed description, taken in conjunction with the drawings in which:

FIG. 1 is a functional block diagram of a software merchandising system constructed and operative in accordance with a preferred embodiment of the present invention; and FIG. 2 is a functional block diagram of a single station software merchandising system constructed and operative in accordance with a preferred embodiment of the present invention.

DETAILED DESCRIPTION OF A PREFERRED EMBODIMENT

Reference is now made to FIG. 1, which illustrates a preferred embodiment of software merchandising system constructed and operative in accordance with a preferred embodiment of the present invention. The system comprises a central memory 10, such as a CD ROM, commercially available from Hitachi of Japan, for example model CDR 1502S. The central memory 10 serves to store programs which are available for sale to customers and preferably also stores information from which appropriate accompanying manuals may be printed. The central memory 10 interfaces with a CPU 12, such as on TBM AT, which, in turn, interfaces with a plurality of customer interface (point of sale) stations 14, which typically comprise IBM Personal Computers 16, having associated therewith credit card readers 18, such as those commercially available from Magtek, Inc. of Carson, Calif., for example MT-50.

CPU 12 also typically interfaces with a modem 20, permitting remote accessing thereof, and a printer 22. Additionally in accordance with a preferred embodiment of the present invention, CPU 12 interfaces with and controls the operation of diskette writing apparatus 24. Diskette writing apparatus 24 typically comprises a standard diskette drive, such as that commercially available from Fujitsu of Japan.

Feeding and removal of diskettes may be accomplished manually. According to a preferred embodiment of the invention, automatic diskette feeding and removal apparatus 26 is provided. This may comprise a commercially available robot 27, programmed to remove a diskette from a selected stack of diskettes 28, place it in a selected diskette drive 30, corresponding to the size of the diskette chosen, and subsequently withdraw the diskette from the diskette drive and dispense it to the consumer. Robot 27 may be similar to the robot employed in automated video film merchandising systems, such as a robot manufactured by IVDM of Kibbutz Ein Harod, Israel, or robot apparatus employed in automatic vending machines such as the Storematic line available from AVAG Betriebsverpflegungs AG of Zurich Switzerland.

Reference is now made to FIG. 2, which illustrates a self-contained merchandising system of the type illustrated in FIG. 1. Here a computer 40, such as an IBM AT includes a central memory containing computer programs to be sold to customers and preferably also contains information from which manuals accompanying the computer programs may be printed.

Preferably associated with computer 40, are a printer 42, a credit card reader 44 and a modem 46. Communication via modem 46 provides remote access by customers, central credit check communication and communication with a remote memory or program supply or update source.

In accordance with a preferred embodiment of the invention, computer 40 is programmed with a program, whose listing is attached hereto as Annex A and which has the following chief functions:
1. Display Customer Interface Questions
   CUSTOMER NAME AND ADDRESS
   MEANS OF PAYMENT
2. Perform a credit check using the credit card reader 44 either via a central credit check bureau or via a list stored in the central memory.
3. Display Customer Choice Menu:
   Key Word search based on a search of key words in names or descriptions of the various programs which are available.
   Type of Program Search
   Word Processors
   Spreadsheets
4. Display further menus listing available programs as per customer choice indication in (3).
5. Provide program access on computer 14 for customer evaluation.
6. Accept customer choice of program to purchase.
7. Accept customer choise of format of carrier. (For embodiment of FIG. 1) (In embodiment of FIG. 2, no format choice is provided).
8. Write purchased program on carrier.
9. Incorporate customer identification, point of sale identification, program identification, date of purchase and program serial number on program and record same for sales records, print out sales record report.
10. (Optional anti copying protection on written program)
11. Print manual corresponding to purchased program.
12. Dispense manual and program to customer. (For embodiment of FIG. 1).

According to the embodiment of FIG. 1, a communications protocol for permitting remote accessing of the point of sale unit by a customer may be provided. Such protocols are entirely conventional and are used in telephone shopping and banking systems.

In accordance with an embodiment of the invention, a communications protocol may be provided for updating the programs stored in the central memory via a remote source, via a modem.

It will be appreciated by persons skilled in the art that the present invention is not limited to what has been particularly shown and described hereinabove. Rather the scope of the present invention is defined only by the claims which follow:

ANNEX A

Explanation of Software and Listing

Explanation of the software package:
The software attached was written in "C". It comprises 5 modules as follows:
1. Soft.c—The main manager of the software.
   Displays entry menu which gets the customer's identification and checks the credit number validity (allowed format for a credit card number—in our example: 9 digits) and compares the number against a "bad-list".
2. Tree.c—Manages the menu selection.
   Categorizes menu selection enabling the customer to seek the desired software item.
3. Key.c—Manages the keyword search.
   Software item search by keyword.
4. Pack.c—Manages demonstration and sale procedure.
   Creates a customer diskette consisting of the program with customer I.D. In our example creates a batch file which has the name of the selected software package and echoes the customer's I.D. and goes on to run the program called go.exe. Then the program copies the purchased software to go.exe.
   In addition, the program copies the transaction details to a file called register 0.001 for bookkeeping and reporting as well as generating hard copy thereof.
5. Myio.c—Handles input from user's terminal.

Pack.c uses the following Microsoft DOS utilities:
FORMAT—to create the diskette on which the program is copied.
PRINT—is used to print the manual accompanying each program.

To demonstrate the ability of the software we have included 2 types of demo software—"Spreadsheets" and "Wordprocessors" called sp1, sp2 and wp1, wp2.
sp1, sp2 and wp1 are each a single file program.
wp2 is a multiple file package.

The customer may then operated the purchased program by typing in the name of the program.

For conciseness the programs and the manuals are not included in the listing that follows:

wp2 is a multiple file package.
   The customer may then operated the purchased program by typing
in the name of the program.
   For conciseness the programs and the manuals are not included
in the listing that follows:

```c
/****** soft.c *******/ include "so.h"

int prn_fd;
unsigned date;
long  l_offset;
struct CUSTUMER cu ;

main()
{  prn_fd = open ("prn", 1) ;
   entry_menu() ;
   tree( &root ) ;
} put_entry()
{  clr_scr;
   mov_cur(5,29);
   puts("*** SoftMat Entry ***");
   mov_cur(6,29);
   puts("=====================");
   mov_cur(8,29);
   puts("Name      :");
   mov_cur(9,29);
   puts("Street    :");
   mov_cur(10,29);
   puts("Town      :");
   mov_cur(11,29);
   puts("Zip code  :");
   mov_cur(12,29);
   puts("Credit No.:");
} entry_menu()
{  int f, c, tdat;
   put_entry() ;
   f = 8;
   while(1)
    {  switch(f)
        { case 8  : c = geta(cu.name, 25, f, 40); break;
          case 9  : c = geta(cu.street, 25, f, 40); break;
          case 10 : c = geta(cu.town, 25, f, 40); break;
          case 11 : c = geta(cu.zip, 25, f, 40); break;
          case 12 : c = geta(cu.credit, 25, f, 40); break;
```

```
    }
    switch (c).
    { case DOWN :
      case CR    : if (f < 12)
                      ++f;
                   else if ( credit_ok() )
                      return;
                   else
                      bell ;
                   break;
      case HOME : f = 8; break;
      case UP   : if (f > 8)
                      --f;
                  else
                      bell;
                  break;
    }
  }
} credit_ok()
{  char bad[120], *b ;
   int bad_fd ;
   if ( strlen( cu.credit ) != 9 )
      return( 0 ) ;
   b = cu.credit ;
   while( *b )
      if ( ! isdigit( *b++ ) )
         return( 0 ) ;
   if ( ( bad_fd = open ( "bad_list.001", 0 ) ) == -1 )
   {  printf("no bad_list file\nStrike any key to continue\n" ) ;
      getchar( ) ;
      return( 1 ) ;
   }
   while ( b = fgets( bad, 110, bad_fd ) )
   {  if ( strncmp( bad, cu.credit, 9 ) == 0 )  /* found bad credit number */
         return( 0 ) ;
   }
   return( 1 ) ;
}

/****** tree.c *******/ include "so.h"

char *sp1names[] = {"sp1.exe", 0 } ;

struct LEAF sp1 = {"sp1", &spred, sp1names, "sp1.man", 0, 9.95,
                   "Spread sheet" } ;

char *sp2names[] = {"sp2.exe", 0 } ;

struct LEAF sp2 = {"sp2", &spred, sp2names, "sp2.man", 0, 24.99,
                   "Spread sheet with macros and graphics" } ;

char *wp1names[] = {"wp1.exe", 0 } ;

struct LEAF wp1 = {"wp1", &word, wp1names, "wp1.man", 0, 49.90,
                   "Word proccesor for documents" } ;
```

```c
char *wp2names[] = {"wp2.exe", "wp2.ov1", "wp2.ov2", 0 } ;

struct LEAF wp2 = {"wp2", &word, wp2names, "wp2.man", 0, 99.99,
                    "Word proccesor (editor) for \"C\" programs" } ;

struct JUNCTION spred = {"Spread Sheets", &root, LAST, { &sp1, &sp2, 0 } } ;
struct JUNCTION word  = {"Word Proccesors", &root, LAST, { &wp1, &wp2, 0 } } ;
struct JUNCTION root  = {"ROOT", 0, MID, { &word, &spred, 0 } } ;

tree( junc )
    struct JUNCTION *junc ;
{   int i, l, down = 1, get_choice ;
    char r[3] ;
    struct JUNCTION **p ;
    struct LEAF **lp ;
    while ( down == 1 )
    {   clr_scr;
        mov_cur(0,20);
        puts( junc->nam ) ;
        mov_cur(1,20);
        l = strlen( junc->nam ) ;
        for ( i=0 ; i<l ; ++i )
            putchar('=');
        mov_cur(3,20);
        if ( junc == &root )
            puts( " 1. Exit" ) ;
        else
            puts( " 1. Previous menu" ) ;
        mov_cur(4,20);
        puts( " 2. Key word search" ) ;
        for ( i=5, p = junc.p.j_sons ; *p ; ++p, ++i )
        {   mov_cur(i,20);
            printf("%2d. ", i - 2 ) ;
            puts( (*p)->nam ) ;
            if ( junc->type == LAST )
            {   mov_cur(i,50);
                lp = p ;
                printf("$%.2f ", (*lp)->price ) ;
            }
        }
        setmem( r, 3, '\0' ) ;
        mov_cur(i,25);
        puts( "Enter your choice - " ) ;
        get_choice = 1 ;
        while ( get_choice )
        {   getn( r, 2, i, 45 ) ;
            l = atoi( r ) ;
            if ( get_choice = ( ( l < 1 ) || ( l > ( i - 3 ) ) ) )
                bell ;
        }
        if ( l == 1 )
            return( 1 ) ;
        else if ( l == 2 )
            down = key_word( junc ) ;
        else if ( junc->type == MID )
            down = tree( junc.p.j_sons[l-3] ) ;
        else    /* type == LAST */
            down = leaf_handler( junc.p.l_sons[l-3] ) ;
```

```
        if ( junc == &root )
            down = 1 ;      /* stop at root */
    }
    return( 0 ) ;
} leaf_handler( leaf )
    struct LEAF *leaf ;
{   int i, l, get_choice ;
    char r[3] ;
    while( 1 )
    {   clr_scr;
        mov_cur(0,20);
        printf("%s    price is - $%.2f ", leaf->nam, leaf->price ) ;
        mov_cur(1,20);
        l = strlen( leaf->nam ) ;
        for ( i=0 ; i<l ; ++i )
            putchar('=');
        mov_cur(3,20);
        puts( " 1. Previous menu" ) ;
        mov_cur(4,20);
        puts( " 2. Enter program" ) ;
        mov_cur(5,20);
        puts( " 3. Purchase the software" ) ;
        mov_cur(6,20);
        puts( " 4. Exit" ) ;
        mov_cur(9,0);
        puts( "Description:\n" ) ;
        puts( leaf->descrip ) ;
        setmem( r, 3, '\0' ) ;
        mov_cur(7,25);
        puts( "Enter your choice - " ) ;
        get_choice = 1 ;
        while ( get_choice )
        {   getn( r, 2, 7, 45 ) ;
            l = atoi( r ) ;
            if ( get_choice = ( ( l < 1 ) || ( l > 4 ) ) )
                bell ;
        }
        switch( l )
        {   case 1 : return( 1 ) ;
            case 2 : demo ( leaf ) ;
                     break ;
            case 3 : pack( leaf ) ;
                     return( 0 ) ;
            case 4 : return( 0 ) ;
        }
    }
}

/****** key.c ******/ include "so.h"

static struct LEAF *keys[MAX_KEYS] ;   /* holds leaves who match key word */
static int key_ind, key_len ;
static char key[80] ;   /* holds key word */
```

```
key_word( junc )
   struct JUNCTION *junc ;
{  int i, l, down = 1, get_choice ;
   char r[3], *ps ;
   setmem( keys, sizeof( keys ), 0 ) ;   /* reset keys array */
   key_ind = 0 ;
   clr_scr ;
   mov_cur(3,0) ;
   puts( "Enter key word ( blanks are checked for!! ) :" ) ;
   setmem( key, sizeof( key ), '\0' ) ;
   geta( key, 79, 5, 0 ) ;
   key_len = strlen( key ) ;
   ps = key ;
   while ( *ps++ = tolower( *ps ) ) ;
   find_key( junc ) ;
   while ( down == 1 )
   {  clr_scr;
      mov_cur(0,10);
      puts( "KEY-WORD: " );
      puts( key ) ;
      mov_cur(1,20);
      l = strlen( key ) ;
      for ( i=0 ; i<l ; ++i )
         putchar('=');
      mov_cur(3,20);
      puts( " 1. Previous menu" ) ;
      for ( i=0 ; i < key_ind ; ++i )
      {  mov_cur(i+4,20);
         printf("%2d. ", i + 2 ) ;
         puts( keys[i]->nam ) ;
      }
      i += 4 ;
      setmem( r, 3, '\0' ) ;
      mov_cur(i,25);
      puts( "Enter your choice - " ) ;
      get_choice = 1 ;
      while ( get_choice )
      {  getn( r, 2, i, 45 ) ;
         l = atoi( r ) ;
         if ( get_choice = ( ( l < 1 ) || ( l > ( i - 3 ) ) ) )
            bell ;
      }
      if ( l == 1 )
         return( 1 ) ;
      else    /* chose a program */
         down = leaf_handler( keys[l-2] ) ;
   }
   return( 0 ) ;
} find_key( junc )
   struct JUNCTION *junc ;
{  struct JUNCTION **p = junc.p.j_sons ;
   if ( junc->type == MID )
   {  while ( *p )
         if ( find_key ( *p++ ) )            /* keys full */
            return(1) ;                       /* signal full */
      return(0) ;                             /* signal not full */
```

```
    }else           /* type == LAST - all sons are leaves */
        return( check_leaves( junc ) );   /* check_leaves reports keys full */
} check_leaves( junc )
    struct JUNCTION *junc ;
{   struct LEAF **p ;
    for( p = junc.p.l_sons ; *p ; ++p )
        if ( search_key( *p ) )            /* found entry */
        {   if ( key_ind < MAX_KEYS )      /* keys not full */
                keys[ key_ind++ ] = *p ;
            else
                return(1) ;                /* signal full */
        }
    return(0) ;                            /* signal not full */
} search_key( leaf )
    struct LEAF *leaf ;
{   /* temporary version */
    char buf[1000], *pb = buf, *ps = leaf->nam, *index() ;
    while ( *pb++ = tolower( *ps++ ) ) ;
    *( pb - 1 ) = ' ' ;
  /*  *pb = '\0' ; puts( buf ) ; */
    ps = leaf->descrip ;
    while ( *pb++ = tolower( *ps++ ) ) ;
  /*   puts( buf ) ; */
    ps = buf ;
    while ( ( ps = index( ps, *key ) ) &&
            ( strncmp( ps, key, key_len ) ) )
        ++ ps ;
    return(ps) ;
}

/****** pack.c *******/ include "so.h"

static station = 5 ;    /* station i.d. */ pack( leaf )
    struct LEAF *leaf ;
{   int fd, i, l, get_choice ;
    char r[3], s[120], **name ;
    clr_scr ;
    mov_cur(3,20) ;
    puts( "Purchase procedure" ) ;
    mov_cur(5,0) ;
    exec( "format.com", "b:" ) ;
    sprintf( s, "b:%s.bat", leaf->nam ) ;
    fd = fopen( s, "w" ) ;
    fprintf( fd, "echo off\n" ) ;
    fprintf( fd, "echo custumer name: %s\n", cu.name ) ;
    fprintf( fd, "echo custumer addr: %s\n", cu.street ) ;
    fprintf( fd, "echo                %s  %s\n", cu.town, cu.zip ) ;
    fprintf( fd, "echo SoftMat product: %s\n", leaf.nam ) ;
    fprintf( fd, "echo Serial No. %d/%x/%d\n",
        station, leaf, leaf->sale_index ) ;
```

```
        fprintf( fd, "pause\n" ) ;
        fprintf( fd, "go" ) ;
        fclose( fd ) ;
        putchar('\n' ) ;
        copy( *(leaf->prog), "b:go.com" ) ;
        name = leaf->prog ;
        while( *++name )
        {   sprintf(s, "b:%s", *name ) ;
            copy( *name, s ) ;
        }
        /* make a registration of the transaction */
        fd = fopen( "c:register.001", "a" ) ;
        dates( s ) ;
        fprintf( fd, "transaction date - %s\n", s ) ;
        fprintf( fd, "custumer name: %s\n", cu.name ) ;
        fprintf( fd, "custumer credit no.: %s\n", cu.credit ) ;
        fprintf( fd, "custumer addr: %s\n", cu.street ) ;
        fprintf( fd, "               %s  %s\n", cu.town, cu.zip ) ;
        fprintf( fd, "SoftMat product: %s\n", leaf.nam ) ;
        fprintf( fd, "Serial No. %d/%x/%d\n\n", station, leaf, leaf->sale_index )

fclose( fd ) ;
        /* make a hard copy on the serial printer as well */
        fd = open( "com1:", 1 ) ;
        fprintf( fd, "transaction date - %s\n", s ) ;
        fprintf( fd, "custumer name: %s\n", cu.name ) ;
        fprintf( fd, "custumer credit no.: %s\n", cu.credit ) ;
        fprintf( fd, "custumer addr: %s\n", cu.street ) ;
        fprintf( fd, "               %s  %s\n", cu.town, cu.zip ) ;
        fprintf( fd, "SoftMat product: %s\n", leaf.nam ) ;
        fprintf( fd, "Serial No. %d/%x/%d\n\n", station, leaf, leaf->sale_index )

close( fd ) ;
        ++ leaf->sale_index ;
        exec( "print.com", leaf->manual ) ;   /* print manual on parallel printer * clr_scr ;
        mov_cur(3,20) ;
        puts( "Remove disket from drive B. Strike any key when ready" ) ;
        gets(s) ;    /* clear input buffer */
} copy( src, dst )
    char *src, *dst ;
{   int i, fd, fd1 ;
    char r[3], s[4100] ;
    fd = open( src, 0 ) ;
    fd1 = creat( dst ) ;
    while ( ( i = read( fd, s, 4096 ) ) > 0 )
        write( fd1, s, i ) ;
    close( fd ) ;
    close( fd1 ) ;
} demo( leaf )
    struct LEAF *leaf ;
{   char r[3], s[120] ;
    sprintf( s, "c:%s.exe", leaf->nam ) ;
```

```
        if ( exec( s, "" ) == -1 )
        {  mov_cur(24,0) ;
           puts( "demo not implemented - strike any ket to continue" ) ;
           bell ;
           scr_ci() ;
        }
}

/******** myio.c ******/ include "so.h"

geta(s,l,y,x)
   char *s;
   int l, y,x;
{  int c, i;
   char *tt, *t, *e;
   mov_cur(y,x);
   if ( ( i = strlen(s) ) < l )
      _setmem ( s + i , l - i , '\0' );
   else
      s[l] = '\0';
   t = s;
   e = s + l;
   cur_off();
   puts(s);
   mov_cur(y,x);
   cur_on();
   while(1)
   {  c = scr_ci();
      if ( ( c >= ' ' ) && ( c <= 128 ) )
      {  *t++ = c;
         if ( t == e )
         {  --t;
            scr_mark(c);
         }else
            scr_co(c);
      }else
         switch(c)
         {  case BS    :
            case LEFT  :
               if (t > s)
               {  putchar('\010');
                  *t-- ;
               }
               else
                  bell;
               break;
            case RIGHT :
               if ( t < (e-1) )
               {  if ( !*t )
                     *t = ' ';
                  scr_co(*t++);
               }else
                  bell;
               break;
```

```
            case DEL  :
                if ( *t )
                { cur_off();
                    for ( tt=t ; *tt ; ++tt )
                    {   *tt = *(tt+1);
                        if ( *tt)
                            scr_co(*tt);
                        else
                            scr_co(' ');
                    }
                    mov_cur(y, x + (t - s));
                    cur_on();
                }else
                    bell;
                break;
            case F1   :
                mov_cur(y,x);
                t = s;
                cur_off();
                for ( i=0 ; i<l ; ++i )
                {   scr_co(' ');
                    *t++ = '\0';
                }
                mov_cur(y,x);
                cur_on();
                t = s;
                break;
            default   :
                if( c = check(c) )
                    return(c);
                else
                {    bell;
                     break;
                }
        }
    }
} putln(s)
    char *s;
{   char *t;
    int i;
    i = 0;
    t = s;
    while(*t) ++t;
    while(--t >= s)
    {    scr_co(*t);
         ++i;
         if ( i == 2 )
            scr_co('.');
    }
    if ( i == 1 )
    {  scr_co('0');
       scr_co('.');
    }
} getn(s,l,y,x)
    char *s;
```

```
    int l,y,x;
{   int c, i;
    char *t, *e, *b, buf[80];
    t = s;
    b = buf;
    while ( *b = *t)
    {   ++t;
        ++b;
    }
    for ( i = b - buf ; i <= l ; ++i )
    {   buf[i] = '\0';
        s[i] = '\0';
    }
    e = s + l ;
    mov_cur(y,x);
    cur_off();
    puts(s);
    while(1)
    {   mov_cur(y,x);
        cur_on();
        c = scr_ci() ;
        cur_off();
        if ( isdigit(c) || (c == LEFT ) || ( c == BS ) )
        {   if ( ( c == LEFT ) || ( c == BS ) )
                if ( *b )
                    *t = *b;
                else
                { bell;
                  continue;
                }
            else
            {   if ( t == e )
                {   for ( i=0 ; i<l ; ++i)
                    {   s[i] = s[i+1];
                        buf[i] = buf[i+1];
                    }
                    --t;
                    --b;
                }
                *t = c;
                *b = c;
            }
            puts(s);
            if ( t < e )
            {   ++t;
                ++b;
            }
        }else
            switch(c)
            {   case RIGHT :
                case DEL   :
                    if ( t > s )
                    {   *--t = '\0';
                        --b;
                        puts(s);
                        scr_co( ' ' ) ;
                    }else
                        bell;
                    break;
```

```
            case F1       :
                mov_cur(y,x);
                t = s;
                for ( i=0 ; i<l ; ++i )
                { scr_co( ' ' ) ;
                   *t++ = '\0';
                }
                mov_cur(y,x);
                t = s;
                b = buf;
                break;
            default   :
                if( c = check(c,s) )
                { cur_on();
                  return(c);
                }else
                { bell;
                  break;
                }
        }
    }
} check(c)
    int c;
{   int f;
    switch(c)
    { case END    :
      case HOME   :
      case CR     :
      case UP     :
      case DOWN   :
      case PGUP   :
      case INS    :
          return(c);
      case '\003' :
          clr_scr ;
          cur_on();
          exit();
    }
    return(0);
} print(s, n)
    char *s;
    int n;
{   char *t;
    int i;
    i = strlen(s);
    t = s + i;
    n -= i;
    while (n-- > 0)
       fputc ( ' ', prn_fd );
    while ( t > s )
       fputc ( *(--t), prn_fd );
}
```

```
printn(s, n)
    char *s;
    int n;
{   n -= strlen(s);
    while ( n-- > 0 )
        fputc ( ' ', prn_fd );
    while ( *s )
        fputc ( *(s++), prn_fd );
} println(s, n)
    char *s;
    int n;
{   char i;
    i = strlen(s);
    while ( i < 2 )
    {   s[2] = s[1];
        s[1] = *s;
        *s = '0';
        ++i;
    }
    n -= i;
    while ( --n > 0 )
        fputc ( ' ', prn_fd );
    while ( *s )
```

I claim:

1. An automated merchandising system for computer software comprising:
   a memory for storing software for distribution to customers;
   a point of sale terminal including customer interface means for receiving a software select customer choice input; and
   means for writing software selected by a customer from the memory onto a software carrier; and
   means for associating an identification code with software provided to a customer, said identification code comprising at least one of the following identification parameters: purchaser identification, point of sale identification and date of purchase, wherein said means for associating comprises means for embedding said identification code on the software carrier.

2. An automated merchandising system for computer software according to claim 1 and also comprising means associated with said customer interface means for verifying means of payment.

3. An automated merchandising system for computer software according to claim 1 and also comprising means for printing manuals accompanying the software selected by the customer and dispensing same to the customer.

4. An automated merchandising system for computer software according to claim 1 and also comprising means for preventing copying of software copied onto the software carrier.

5. An automated merchandising system for computer software according to claim 1 and wherein said memory is located at a point of sale terminal.

6. An automated merchandising system for computer software according to claim 1 and wherein said memory is located at a location remote from a point of sale terminal and is connected therewith terminals by means of a modem.

7. An automated merchandising system for computer software according to claim 1 and comprising a plurality of point of sale terminals in communication with said memory.

8. An automated merchandising system for computer software according to claim 1 and wherein said memory also contains information used to print manuals.

9. An automated merchandising system for computer software according to claim 1 and wherein said point of sale terminal includes means permitting remote access by a customer via a modem.

10. An automated merchandising system according to claim 1 and also comprising means for dispensing said carrier bearing the software selected by the customer to the customer.

11. An automated merchandising system according to claim 1 and wherein said memory comprises a CD ROM.

12. An automated merchandising system according to claim 1 and also comprising means for generating a sales report in hard copy form including at least one of the following identification parameters: purchaser identification, point of sale identification, program identification, date of purchase, serial number for program copy.

13. An automated merchandising system according to claim 1 and also comprising means for generating and displaying a menu for enabling a potential customer to locate software in which he has a potential interest.

14. An automated merchandising system according to claim 1 and also comprising key word search means enabling a potential purchaser to search available programs via key words in their names or descriptions.

15. An automated merchandising system according to claim 1 and also comprising demonstration computer means for providing to a potential customer the opportunity for operating the software prior to a decision to purchase.

16. An automated merchandising system according to claim 1 and also comprising:
    means for generating a sales report in hard copy form including at least one of the following identification parameters: purchaser identification, point of sale identification, program identification, date of purchase, serial number for program copy; and means for generating and displaying a menu for enabling a potential customer to locate software in which he has a potential interest, and wherein said means for associating comprises means for imbedding said identification code on the software carrier.

17. An automated merchandising system according to claim 1 and also comprising:

key word search means enabling a potential purchaser to search available programs via key words in their names or descriptions; and demonstration computer means for providing to a potential customer the opportunity for operating the software prior to a decision to purchase.

18. An automated merchandising system according to claim 16 and also comprising:

key word search means enabling a potential purchaser to search available programs via key words in their names or descriptions; and demonstration computer means for providing to a potential customer the opportunity for operating the software prior to a decision to purchase.

* * * * *

(12) EX PARTE REEXAMINATION CERTIFICATE (6696th)
United States Patent
Orbach

(10) Number: US 4,949,257 C1
(45) Certificate Issued: Mar. 17, 2009

(54) AUTOMATED MERCHANDISING SYSTEM FOR COMPUTER SOFTWARE

(75) Inventor: Zvi Orbach, Haifa (IL)

(73) Assignee: Softmat LLC, Los Angeles, CA (US)

Reexamination Request:
No. 90/006,197, Jan. 17, 2002

Reexamination Certificate for:
Patent No.: 4,949,257
Issued: Aug. 14, 1990
Appl. No.: 07/433,395
Filed: Nov. 7, 1989

Related U.S. Application Data

(63) Continuation of application No. 07/184,923, filed on Apr. 22, 1988, now abandoned.

(30) Foreign Application Priority Data

Apr. 28, 1987 (IL) ................................. 82370

(51) Int. Cl.
*G06Q 99/00* (2006.01)

(52) U.S. Cl. ........................ 705/21; 700/234; 700/236; 700/237; 705/18

(58) Field of Classification Search ........................ None
See application file for complete search history.

(56) References Cited

U.S. PATENT DOCUMENTS

| | | | |
|---|---|---|---|
| 3,670,310 A | | 6/1972 | Bharwani et al. ......... 340/172.5 |
| 4,247,759 A | | 1/1981 | Yuris et al. .................. 235/381 |
| 4,314,356 A | * | 2/1982 | Scarbrough ................... 707/6 |
| 4,449,186 A | | 5/1984 | Kelly et al. ................. 364/407 |
| 4,528,643 A | | 7/1985 | Freeny, Jr. .................. 364/900 |
| 4,652,990 A | | 3/1987 | Pailen et al. ............... 364/200 |
| 4,658,093 A | | 4/1987 | Hellman ..................... 380/25 |
| 4,789,863 A | | 12/1988 | Bush .................... 340/825.35 |
| 4,999,806 A | | 3/1991 | Chernow et al. ........... 364/900 |
| 5,046,042 A | * | 9/1991 | Nitatori et al. ............. 710/60 |
| 5,309,355 A | | 5/1994 | Lockwood ................. 364/401 |

OTHER PUBLICATIONS

Elizabeth Ferrarini, "Direct Connections for Software Selections," Business Computer Systems, Feb. 1984.
Applesoft II Basic Programming Reference Manual, Apple Computer, Inc., 1978, 1981, p. 121.
"Source book: a computerized store," *Time*, Jul. 9, 1979, at 62.
Christopher Byron, "May the Source Be with You," *Time*, Oct. 26, 1981, at 63.
Article, *Money*, Nov. 1982, p. 81.
Alfred Glossbrenner, "A Source of Riches," *Science Digest*, Aug. 1983, pp. 24–25, 108–109.
Alfred Glossbrenner, "Electronic Jackpot," *Science Digest*, Sep. 1983, pp. 22, 24–25.
Sasha Lewis, *Plugging In—The Microcomputerist's Guide to Telecommunications*, Chilton 1984, pp. 66–71.
Sam Fedida & Rex Malit, *Viewdata Revolution*, John Wiley & Sons 1979, pp. 105–106.
James Martin, *Viewdata and the Information Society*, Prentice–Hall 1982, pp. 13, 65–67, 89, 92–93, 129, 153.
Neil Shapiro, "PM Electronics Monitor: PM on 'The Source,'" *Popular Mechanics*, Jan. 1980, p. 10.
Jules H. Gilder, "Dial–Up Software Networks," *Radio–Electronics*, May 1980, pp. 70–71,108.
"Software and Data via Telephone," *Radio–Electronics*, Oct. 1980, pp. 74–77.
Herb Friedman, "Dial–Up Software Networks," *Radio–Electronics*, Oct. 1982, pp. 131–134.

(Continued)

*Primary Examiner*—Jalatee Worjloh

(57) ABSTRACT

An automated merchandising system for computer software [including] *may include* a central memory for storing software for sale to customers, interface apparatus for receiving a software [select] customer [choice] *software selection* input [having associated therewith payment identification apparatus], and apparatus for writing software selected by a customer, *and an identification code,* onto a software carrier and dispensing same to the customer.

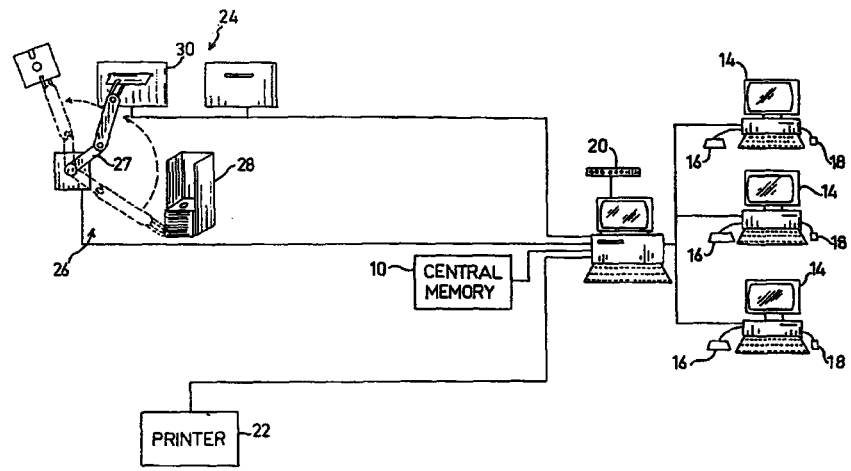

OTHER PUBLICATIONS

Figure 1:
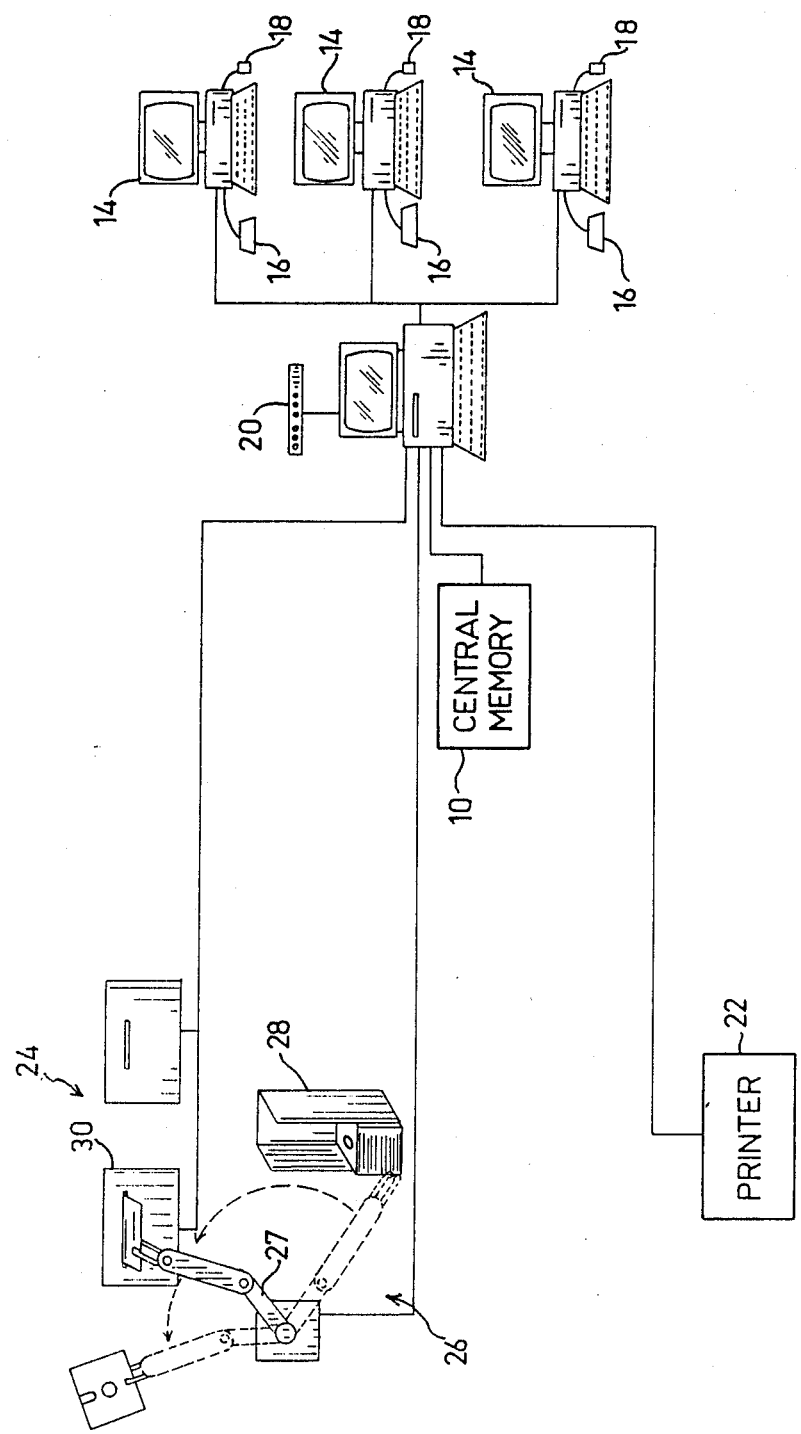

Excerpt from Michael Crichton, *Electronic Life*, Alfred A. Knoph 1983, p. 10.
Excerpt from Jack B Rochester & John Gantz, *The Naked Computer*, William–Morrow & Co. 1983, p. 296.
Jerry Willis & Merl Miller, *Computers for Everybody*, Dilithium Press, 3d ed. 1984, pp. 112–116.
Loy A. Singleton, *Telecommunications in the Information Age*, Billinger 1983, pp. 115–165.
Excerpt from James Martin, *The Wired Society*, Prentice–Hall 1978, pp. 42–43, 68–69, 82–85, 106–107, 120–121, 150–171.
Elizabeth Ferrarini, *Infomania—The Guide to Essential Electronic Services*, Houghton–Mifflin 1985, pp. 84–98, 208–217.
Telephone Software Connection brochure, 1982.
Telephone Software Connection brochure and product list, 1984.
Telephone Software Connection brochure, Jun. 1985.
"News from T.S.C.," Telephone Software Connection, Mar. 1985.
"News from T.S.C.," Telephone Software Connection, Jun. 1984.
"News from T.S.C.," Telephone Software Connection, Dec. 1984.
"News from T.S.C.," Telephone Software Connection, Jun. 1983.
"News from T.S.C.," Telephone Software Connection, Oct. 1983.
"Business Computer Network—Among the Missing," *Software Industry Bulletin*, Digital Information Group, Oct. 14, 1985, p. 4.
"Vendors Kick Off Fall Season With Teledelivery Ventures," *Download* newsletter, vol. 2, No. 9, International Resource Development, Sep. 1985.
Speeds "Electronic Delivery of Software" brochure, Gimcrax 1985.
Speeds brochure, Gimcrax 1985.
Gimcrax, Inc. brochure, 1984.
Speeds brochure, Gimcrax Feb. 20, 1985.
Speeds brochure, Gimcrax 1983.
Speeds brochure, Gimcrax Oct. 21, 1985.
Speeds brochure, Gimcrax Nov. 22, 1985.
"Gimcrax Launches File Delivery Service," *Communications Week*, Dec. 23, 1985.
"Gimcrax to Downlaod 'Low–Price' Consumer Software by January," *Newsnet*, Aug. 1984.
Elizabeth Ferrarini, "Buy Software Via Modem," *Micro–Communications*, May 1984, pp. 30–33.
TeleSun brochure, 1983.
Rob Fixmer, "The Great Downloading Debate," *Link–up*, May 1984, pp. 22–23, 27.
"ABC Video Enterprises' Telefirst Product Has Boosters & Doubters," *Communications Daily*, May 1, 1984.
*Download* newsletter, International Resource Development, Feb. 1985.
B.G. Yovovich, "Pulling the Plug on Electronic Publishing," *Advertising Age*, Apr. 26, 1984.
Joanne Gamlin, "Software Directors Go On–Line," *Computer Merchandising*, Jan. 1984, pp. 114–125.
Mary–Beth Santarelli, "It's Not the Same Old 'Help' Anymore," *Software News*, Apr. 1984, pp. 45–46.
Richard Lewis, "Are You Getting Ready for Electronic Software Delivery?" *Software Retailing*, Feb. 1984, pp. 38–41.

"Xante to Distribute Software Electronically to Mass Merchandisers, " *Micro Software Today*, Feb. 1984.
Jan. 3, 1984 letter and brochure, 1984 Brochure only.
"Romox is hoping to have system in 3,000 stores by end of '84," *Computer + Software News*, Nov. 21, 1983.
Lisa Raleigh, "Bugs in electronic software distribution not yet worked out," *Micro Marketworld*, Nov. 28, 1983, pp. 63–65.
Bulletin from International Resource Development: "Downloding & Teledelivery of Computer Software, Music & Video," Feb. 1986.
Bulletin from International Resource Development: "Downloding & Teledelivery of Computer Software, Music & Video," Jul. 1983.
"Catalog of Publications," International Resource Development, Jun. 1983.
Alfred Glossbrenner, *The Complete Handbook of Personal Computer Communications*, St. Martin's Press 1985, pp. 108–109.
Lawrence Kilman, "Poll: Adults believe children know more about computers," *Rocky Mountain News*, Oct. 16, 1985.
"Electronic Mall," *PC Communications*, Data Decisions Sep. 1985, p. 9.
Elizabeth Horwitt, "Protecting Your Network Data," *Business Computer Systems*, Jul. 1985, pp. 44–45, 48–53.
"Shopping for software at home, by phone," *Entry*, Jan.–Feb. 1985, p. 30.
"Software Online," *Online Today*, Dec. 1984, p. 9.
Reader Service articles, *Link–up*, Dec. 1984, pp. 55–56, 59–60.
"For Reference: Communications Software," *Business Computer Systems*, Nov. 1984, pp. 106, 111–112, 117.
Jessica Paioff, "Communications," *InfoWorld*, Aug. 20, 1984, p. 36.
"A Sampling of Available Graphics Programs," *Interface Age*, Oct. 1984, pp. 124–125.
Margaret P. Ezell, "In Search of the Consummate Time Manager," *Software Supermarket*, May 1984, pp. 41–44.
Ed Magnin, "Getting Hooked on Data Communications," *Nibble Magazine*, Mar. 1984, pp. 110–111.
Ed Magnin, "A Software Vending Machine," *Call A.P.P.L.E.*, Mar. 1984, p. 29.
Ronald R. Cooke, "Now, Software is Distributed by Wire," *Software News*, Nov. 1983, p. 32.
List of software products, *Softalk*, Dec. 1983, pp. 214, 245–246, 269–270, 275–276, 281–282, 293–294, 325–326.
Art Ude, "The TRS Connection," *Call A.P.P.L.E.*, Nov. 1983, pp. 55–56.
"Voicemail Electronic Mail," *InCider*, Nov. 1983, p. 254.
Ed Magnin, "Telecommunications Advisor," *InCider*, Nov. 1983, pp. 128, 130.
Lisa B. Stahr, "Special Delivery Software," *PC World*, Oct. 1983, pp. 69–73.
"Shopper: Direct Delivery of Software Has New Appeal," *PLUMB*, vol. 1, No. 1, June 1983, p. 4.
Jessica Schwartz, "Lisa and Software Writers: No Love at First Bite?" *Tech Weekly*, May 12, 1983.
"What's New This Month?" *InCider*, Jun. 1983, p. 10.
Ed Magnin, "Telecommunications Adviser," *InCider*, Jun. 1983, pp. 66–70.
"Downloader's Supermarket," *Popular Computing*, Jun. 1983, p. 20.
Letters, *Peelings II*, vol. 4, No. 2, 1983, pp. 8–9.

William M. Bulkeley, "Electronic Software Delivery Threatens Mail and Store Sales," *Wall Street Journal*, May 6, 1983, p. 23.
Page from *Advertising Age*, Apr. 11, 1983.
*Digest of Information on Phototypesetting*, vol. 5, No. 3, Apr. 1983, pp. 1–4.
"Western Union's EasyLink Gets Direct Telex–to–PC Connection," *Information Systems News*, Mar. 21, 1983.
Excerpt from *The Book of Apple Software*, 1983.
Excerpt from *Softalk*, Apr. 1983, p. 142.
Joanne Cleaver, "Programs boogie with disk–o–tech," *Advertising Age*, Apr. 11, 1983, pp. 36–37.
Deborah de Peyster, "Marketing Moves," *ISO World*, Mar. 7, 1983, p. 12.
Excerpt from Thunderblock Plus User's Guide, Thunderware Inc. 1983.
Duane Sandul, "Pinball Wizardry's Gone Electric," *The Times–Weekend*, Feb. 12, 1983, p. 25A.
Duane Sandul, "Programmed to trim that waistline," *The Times–Weekend*, Feb. 5, 1983, p. 26A.
Duane Sandul, "High adventure for the yo[ung]," *The Times–Weekend*, Jan. 29, 1983, p. 24A.
Michael L. Weasner, Review of "Programmers Library," *Peelings II*, Dec. 1982, pp. 30 ff.
John Mitchener, Review of "Telephone Transfer II," *Peelings II*, Nov. 1982, p. 51.
Val J. Golding, "The Telephone Software Connection: A Review (of Sorts)," *Call A.P.P.L.E.*, May 1980, p. 24.
Utah State University Office of Computer Services Newsletter, Jan. 1983.
Stan Miastkowski et al., "Modems: Hooking Your Computer to the World," *Popular Computing*, Dec. 1982, pp. 111–118.
List of Software from *Softalk*, Dec. 1982, pp. 155–156, 171–174, 188–195.
Page from Microcomputing, Dec. 1982.
"Telephone Transfer II," *Call A.P.P.L.E.*, Nov. 1982, p. 76.
Excerpt from *Softalk*, Nov. 1982, p. 33.
Excerpt from *Business Computer Systems*, Oct. 1982, pp. 98–109.
"Delivery Over The Phone," *Data Communications*, Oct. 1982.
Athol H. Cohen, "Modems and the Micromodem II" *Maple Orchard*, pp. 22–24, 27.
Excerpts from *Softalk*, Sep. 1982, pp. 137–138, 168–170.
"Software Via Telephone," New Products, *CCN*, Sep./Oct. 1982, p. 68.
Susan Chace, "Makers Transform the Ways Computer Programs are Sold," *Wall St. Journal*, Aug. 26, 1982, p. 25.
Excerpts from *Softalk*, Aug. 1982.
Leighton Paul, "Patching DOS the Easy Way," *Call—APPLE*, Jul. 1982, p. 49.
Bernard S. Husbands, "Electronic Mail System Enhances Delphi Method," *Journal of Business Forecasting*, Summer 1982, pp. 24–27.
"Delivery In Minutes," *Popular Computing*, May 1982, p. 26.
"Dial Up Software Service," *Radio & Records*, Apr. 16, 1982.
"Let Your Modem Do the Talking," *Byte*, Mar. 1982, p. 477.
Excerpt from *Microcomputing*, Feb. 1982, p. 165.
Excerpts from *Arithmetic Teacher*, Jan. 1982.
Steve Ditlea, "A Guide to Personal Computers," *New York*, Dec. 14, 1981, pp. 46 ff.

Theron Fuller, "A Line on Friendly Utilities," *Softalk*, Nov. 1981, p. 95.
Theron Fuller, "A Line on Friendly Utilities," *Softalk*, Nov. 1981, p. 107.
"Conference Goes On–Line," *Computer World*, Nov. 30, 1981.
Bernarad S. Husbands, "Predicting the Future with Electronic Mail," *Microcomputing*, Oct. 1981, pp. 86–87.
Michael Swaine, "Program Shopping by Phone: Software Co. Downloads Programs," *InfoWorld*, Oct. 19, 1981, p. 6.
Michael Swaine, "The Present and Future of Home Information Services," *InfoWorld*, Oct. 12, 1981, p. 19.
Jeffrey Mazur, "Terminal Data," *Softalk*, Sep. 1981, pp. 77–80.
*Dataloop*, Hayes Microcomputer Inc., Jul. 1981.
George Bonds, article from *Washington Star*, Jun. 7, 1981.
Ed Magnin, review of Math Tutor and Spelling Tutor, *Softalk*, Jun. 1981, pp. 56, 58.
Information Intelligence Online Newsletter, Feb. 5, 1981, p. 4.
Telephone Software Connection advertisement, Feb. 1981.
"Marketalk," *Softalk*, Jan. 1981, p. 28.
Frank J. Derfler, Jr., "Coming in 1981: Talking Terminals, Software By Phone On the Horizon," *Microcomputing*, Jan. 1981, p. 16.
Excerpt from Chuck Carpenter, "Software by Phone," *Creative Computing*, Dec. 1980, p. 202.
Extract from "Marketalk News," *Softalk*, Nov. 1980, p. 36.
Chuck Carpenter, "Software Over the Phone," *Creative Computing*, Jul. 1980.
Certificate of Copyright Registration for "Answering Machine" dated Apr. 4, 1980.
Certificate of Copyright Registration for "Telephone Transfer II" dated Oct. 29, 1982.
"Young arcadians come home," *InfoWorld*, vol. 5, No. 27, Jul. 4, 1983, pp. 30.
Certificate of Copyright Registration for "Time and Money Meter" dated Jul. 8, 1981.
Edith Holmes, "Direct broadcast's potential for delivering data services," *Data Communications*, Sep. 1984, pp. 70, 72.
Semir Sirazi, et al., "Session XVI: CATV 1," *1984 IEEE International Conference on Consumer Electronics*, Jun. 7, 1984., pp. 224–225.
Neil Shapiro, "Now your home computer can call other computers on the telephone," *Popular Mechanics*, Mar. 1981, pp. 130–131, 150.
J. Postel, et al., "File Transfer Protol (FTP)" [RFC 959], Network Working Group, Oct. 1985, as printed from ftp://ftp.isi.edu/in–notes/rfc959.txt.
Certificate of Copyright Registration for "Answering Machine" and registerd source code, dated Jan. 15, 1980.
Certificate of Copyright Registration for "Telephone Transfer II" and registered source code, dated Oct. 29, 1982.
Bob Davis, "Coleco, AT&T Unit to Form Joint Venture to Distribute Video Games by Telephone," *Wall Street Journal*, dated Sep. 7, 1983.
Alfred Glossbrenner, "How to Get Free Software: The Master Guide to Free Programs for Every Brand of Personal or Home Computer," St. Martin's Press, dated Aug. 1984, pp. 341–346, 423.
Expert Report of Dennis Allison (with Exhibits) (*Softmat, LLC v. Beyond.com Corp.*), Nov. 30, 2000.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–18 are cancelled.

* * * * *